United States Patent

[11] 3,593,601

| [72] | Inventor | Frederick R. McFarland<br>Lancaster, Pa. |
|---|---|---|
| [21] | Appl. No. | 789,566 |
| [22] | Filed | Jan. 7, 1969 |
| [45] | Patented | July 20, 1971 |
| [73] | Assignee | K-D Manufacturing Company<br>Lancaster, Pa. |

[54] WRENCH
3 Claims, 4 Drawing Figs.

[52] U.S. Cl................................................ 81/72,
81/170
[51] Int. Cl...................................... B25b 13/48,
B25b 13/16
[50] Field of Search........................................ 81/71, 72,
170, 172, 117, 179, 119; 294/93, 94

[56] References Cited
UNITED STATES PATENTS
177,521   5/1876   Joslyn........................... 81/170

| 1,617,150 | 2/1927 | Fisher............................ | 81/72 |
| 1,380,052 | 5/1921 | Fowble........................... | 81/72 |
| 1,197,523 | 9/1916 | Maxwell......................... | 81/72 |
| 1,245,754 | 11/1917 | Matteson........................ | 81/72 |
| 3,389,624 | 6/1968 | Pooler............................ | 81/129 |

FOREIGN PATENTS
15,368   1887   Great Britain................   81/170

*Primary Examiner*—James L. Jones, Jr.
*Attorney*—Paul and Paul

ABSTRACT: A device is disclosed, for use in operation in a manner generally similar to that of a wrench, comprising opposed relatively moveable jaws carried on a lever arm, with means being provided for adjusting the positions of the jaws relative to one another and for applying gripping forces, whereby various apparatus may be gripped, particularly for engagement inside bores of disc brake pistons, for removal of the same.

PATENTED JUL 20 1971

3,593,601

INVENTOR.
Frederick R. McFarland

BY

Paul & Paul

ATTORNEYS.

WRENCH

BACKGROUND OF THE INVENTION

With the advances in automotive technology, particularly the development in utilization of disc brakes on automobiles, trucks and the like, it has become commonplace for wheels to have discs disposed generally parallel to the wheels, and generally carried by the same shaft or axle which carries the wheel, with such discs being adapted to be engaged on opposite sides by brake shoes, simultaneously such that the forces applied by such brake shoes tend to offset one another with respect to introducing sidewardly directed forces onto the disc.

In order to effect braking actions of the type above described, each brake shoe generally has a lining of asbestos of other suitable material adapted for effecting a braking action by sliding along the disc under force, with each shoe being carried by generally two pistons, each such piston being disposed within its own bore of a housing, and with each piston having a slight stroke or movement, as required in order to effect a braking action.

In some instances, the linings of the brakes shoes may be replaced without requiring complete disassembly of the system, but in other instances such is not the situation. Moreover, the packings or dust boots which are carried by the piston and which engage the wall of the bore which receives the piston may become worn or torn, and require replacement. Still further, the springs which are normally present within the bore, and which provide a biasing force on the piston in the direction of the disc surface to be engaged by the shoe lining, may also become broken, damaged, lose their resiliency or otherwise need replacement. Still further, brake fluid communication ports may become clogged and need cleaning. These operations discussed herein are attendant to normal maintenance on disc brakes, and generally require the removal of the disc brake pistons. Other operations may also require such piston removal, as for example, a scoring or marring of the piston cylinder which may require honing or the like, along with replacement of an oversized piston. However, in many of these instances, particularly when the piston cylinder becomes scarred, the piston has become firmly seated within its bore during continued use, such that removal of the piston by ordinary types of pliers and wrenches, and by prying the piston out of its bore by means of a screwdriver and the like, becomes highly cumbersome, difficult, and in most instances unsuccessful.

SUMMARY OF THE INVENTION

The present invention is therefore directed toward providing a novel wrench, or tool adapted to engage and securely grip members to be removed, particularly adapted to internally engage members for removal, by applying forces tending to separate jaws which engage internal surface portions of the members to be removed, and by exerting leverage onto the item to be removed, through the jaws of the wrench, once its gripping forces are set.

Accordingly, it is a primary object of this invention to provide a novel gripping wrench.

It is a further object of this invention to provide a novel tool comprising a lever arm which carries jaws adapted for movement away from one another to grip internal surfaces of articles to be removed, and wherein a device is provided adapted for adjustment of the relative spacing between gripping portions of the jaws, as well as for applying the attendant gripping forces through the jaws, onto the article to be engaged.

It is a further object of this invention to provide a novel wrench adapted for the removal of pistons of disc brake devices, by engaging the pistons at internal portions thereof, and exerting twisting forces by means of a lever arm.

Other objects and advantages of the present invention will become apparent to one skilled in the art from a reading of the following brief description of the drawing figures, detailed description of the preferred embodiment, and the appended claims.

IN THE DRAWINGS

Figure 1:
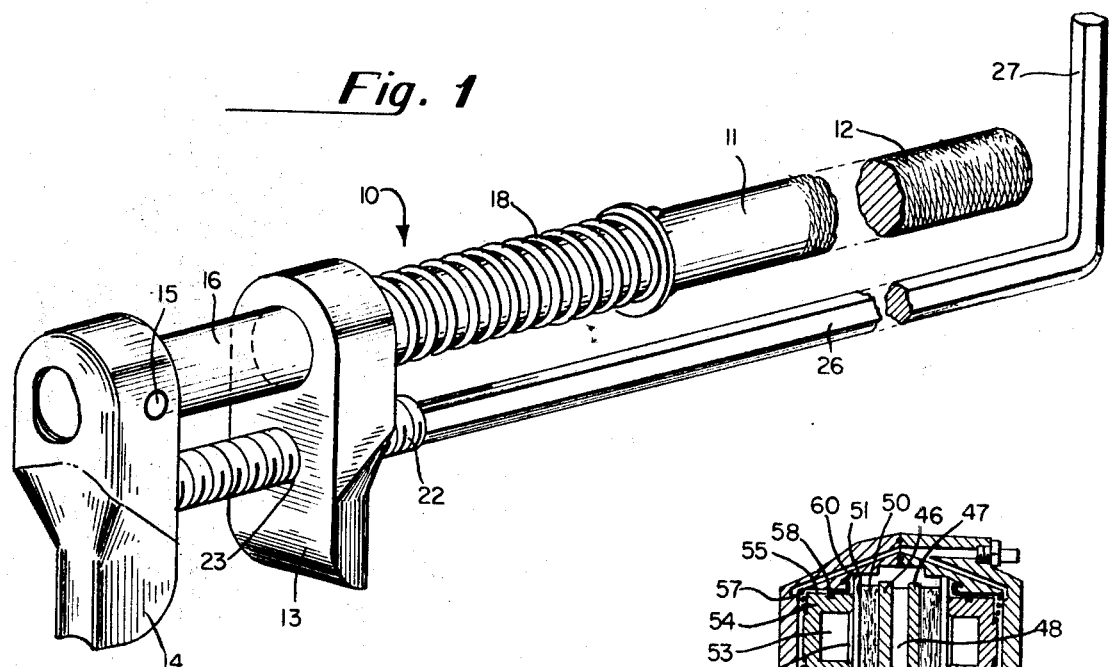
FIG. 1 is a perspective view of the wrench or tool in accordance with this invention.

Referring now to the drawings in detail, reference is first made to FIG. 1, wherein there is illustrated the wrench or tool of this invention, generally designated by the numeral 10, comprising a lever member 11, generally of cylindrical stock, the rightmost end thereof being knurled, or otherwise roughened, as illustrated by the numeral 12, in order to adapt the tool for engagement by the hand of a user.

The lever member 11 carries a pair of jaws 13 and 14, the jaw 14 being fixedly mounted at the leftmost end of the lever member 11 by means of a pin 15 extending through both the jaw member 14 and the end of the lever member 11. Thus, the jaw 14 is fixed in axial position at the end of the lever member 11, and is also fixed against rotational movement thereabout.

The jaw member 13 is axially slideable along the surface 16 of the lever member 11, due to the bore 17 thereof being in sliding fit relation relative to the surface 16 of the shaftlike lever member 11.

Figure 3:
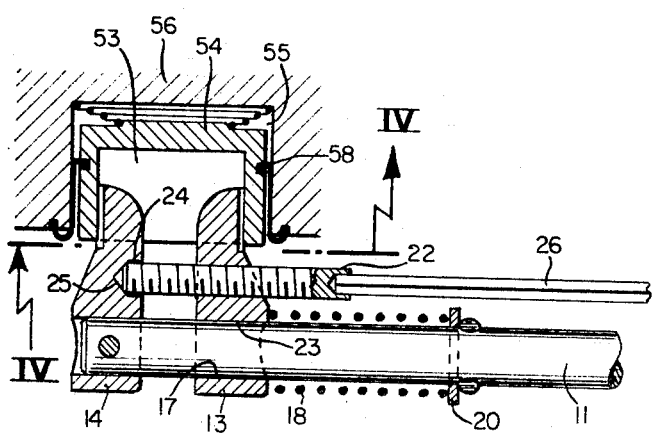
FIG. 3 is an enlarged longitudinal sectional view, fragmentally illustrated, of the tool of this invention in gripping engagement within a disc brake piston of the type illustrated in FIG. 2.

A helical compression spring 18 is disposed about the shaftlike lever member 11, having its leftmost end, as viewed in FIG. 3, in biasing engagement against the slideable or moveable jaw member 13, for urging the moveable jaw member 13 toward the fixed jaw member 14. The rightmost end of the spring 18 is in engagement against a washer 20 which abuts against a snapring or the like 21 for limiting the movement of the washer 20 to the right, as viewed in FIG. 3.

A threaded member 22, having conventional screw threads on the outer surface thereof is in threaded engagement with a tapped bore 23 of the moveable jaw member 13, with the leftmost end of the threaded member 24 being received in sliding unthreaded relationship within a blind hole 25 in the rightmost side of the fixed jaw member 14, as viewed in FIG. 3. The threaded member 22 is provided with an extension arm 26, of suitable hex stock or the like, having an upturned leverage applying crank arm 27 at the extreme right end thereof, as viewed in FIG. 1, in the general vicinity of the knurled portion 12 of the lever arm 11, with the crank 27 of the extension 26 being adapted when turned, to adjust the position of the moveable jaw member 13.

It will be noted that the jaw members 13 and 14 are provided with piston engaging edges 28, 30, 31 and 32 respectably, with respectively associated arcuate recesses 33 and 34 between associated edges, in order that each jaw 13 and 14 may grip the inside circumferential surface of a piston at two distinct places.

Figure 2:
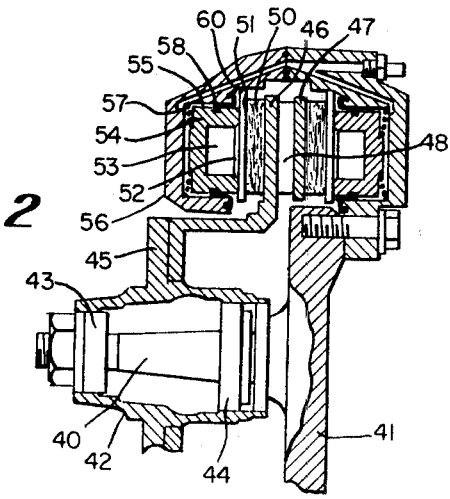
FIG. 2 is a vertical sectional view, taken through a wheel spindle and disc brake assembly of the type to which the tool of this invention is specifically addressed, for the removal of pistons thereof.

With particular reference to FIG. 2, a typical arrangement for disc brakes may be clearly understood. In FIG. 2, there is illustrated a wheel spindle 40, having a steering knuckle 41 at the right end thereof and secured thereto, with a hub 42 being disposed at the left end of the spindle, and being carried by bearings 43 and 44 at opposite ends, with the hub 42 having a wheel mounting portion 45, to which a wheel may be secured by means of bolts (not shown). A brake disc 46 is provided, also mounted on the hub 42 by bolts securing it to the wheel mounting portion 45. An adjacent braking disc 47 is also provided, with the discs 46 and 47 being spaced by a suitable fan-type connection member 48, adapted for cooling the discs 46 and 47. In engagement against each of the discs 46 and 47 is a suitable shoe lining, such as that 50 of asbestos or the like, which is carried by a brake shoe 51, being riveted, bonded or otherwise secured to the shoe 51. The shoe 51 is provided with a circumferential rear shoulder 52, which is partially received within a bore 53 of a piston 54, the bore 53 being provided for purposes of weight reduction and to avoid heat retention.

Each piston 54 is disposed within a suitable bore 55 of a housing 56, and is biased toward its associated disc 46 by means of a spring 57 in engagement against the bottom of the piston 54 and the bottom of the cylindrical bore 55. A suitable boot or oil seal packing 58 is provided, disposed within a circumferential groove of the piston 54, between the piston external sidewall and bore inner wall, such that hydraulic fluid entering the line 60 for exertion against the rear end of the piston 54, for driving the piston and its carried shoe lining 50 toward the disc 46. It will be noted that each shoe 51 is provided with two side-by-side pistons 54, similarly mounted in adjacent cylindrical bores 55.

As has been mentioned above, the cylindrical bores 55 may become scored, or any other deformation can take place such that the piston 54 may not be readily removable from the housing 56. Furthermore, the boot 58 may become hardened, causing a wedging of the piston 54 within the bore 55.

Figure 4:
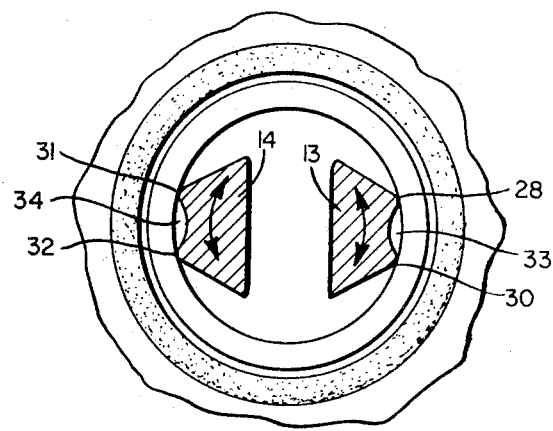
FIG. 4 is an enlarged fragmentally illustrated end view of a piston of the type shown in FIG. 2, taken generally along the line IV-IV of FIG. 3, wherein the gripping edges of the tool jaws are illustrated in engagement within the bore of the piston illustrated in FIG. 3.

The tool 10 of this invention is specifically adapted for the removal of pistons 54, by inserting the jaws 13 and 14 of the tool 10 into the bore 53 of the piston, in the manner illustrated in FIGS. 3 and 4, followed by a turning of the crank 27 for adjusting the position of the moveable jaw 13 relative to the fixed jaw 14, such that the jaws 13 and 14 assume positions as illustrated in FIG. 4, with edges 28, 30, 31 and 32 in engagement against the cylindrical wall of the bore 53 of the piston 54. Once such engagement is effected, the desired gripping force may be provided, by additionally turning the crank 27, such that the jaws 13 and 14 become tightly engaged within the bore 53 of the piston 54. Such additional tightening of the crank arm 27 will lock the tool 10 in such a position, in order that a mechanic may then grasp the knurled handle portion 12 of the lever arm 11, and twist such handle portion clockwise and counterclockwise in a back-and-forth motion, with respect to the illustration of FIG. 4, while also lifting outwardly on the handle portion 12 of the lever member 11, such that the piston 54 is gradually twisted out of the bore 55.

It will be noted that the tool 10 of this invention is adapted for use without requiring complete disassembly of the disc brake hydraulic systems, in many instances, in that it is useable from the side of the mounted piston 54, rather than from directly in front of the piston opening 53. This also provides the additional advantage that greater twisting and leverage forces may be applied for removal of the piston 54.

It will be apparent from the foregoing, that various modifications may be made in the details of construction of the tool of this invention, as well as in the use and operation thereof, all within the spirit and scope of the invention as defined in the appended claims.

I claim:

1. A wrench for gripping disc brake pistons and like articles by internal engagement thereof, comprising: a lever arm having one end adapted to be manually gripped and comprising a force-applying handle portion for exertion of wrench-using forces thereon, a pair of gripping jaw members carried by said lever arm at an opposite end with one said jaw member being fixedly mounted on said opposite end of said lever arm, with the other said jaw member being slideably mounted for movement along said lever arm, with both said jaw members protruding laterally of said lever arm generally transverse thereto but parallel to each other and with each said jaw member terminating in a force-applying article-engaging free end thereof at a location remote from its mounting on said lever arm, with means carried by said jaw members for adjustment of the relative distance between said jaw members, said means having an elongated handle portion extensible to a position laterally adjacent said one end of said lever arm, with said adjustment means being in engagement with each said jaw member at a location along each jaw member between its mounting on said lever arm and its free end, with said adjustment means cooperating with said jaw members to comprise means for applying article-engaging forces to articles by adjusting the relative positions of said jaw members at locations near the force-applying free ends thereof, including a coil spring carried by said lever arm, having one end in endwise engagement therewith, and with the other end in endwise engagement with said movable jaw member for urging the same toward said fixed jaw member, with said adjustment means being seated in the fixed said jaw member in abutting unconnected relation therewith and being in threaded engagement with the movable said jaw member, and with said spring being operative through said movable jaw member to maintain said adjustment means in abutting seated relation relative to said fixed jaw member.

2. The wrench of claim 1, wherein said adjustment means is carried only by said jaw members.

3. The wrench of claim 1, wherein said adjustment means comprises a single movable member, the actuation of which actuates said movable jaw member.